United States Patent [19]

Katzenstein

[11] Patent Number: 4,504,714
[45] Date of Patent: Mar. 12, 1985

[54] SYSTEM AND METHOD FOR IMPACT WELDING BY MAGNETIC PROPULSION

[76] Inventor: Jack Katzenstein, 855 Haverford Rd., Ramona, Calif. 92065

[21] Appl. No.: 317,560

[22] Filed: Nov. 2, 1981

[51] Int. Cl.³ .................. B23K 13/00; H05B 5/00; H05B 6/00
[52] U.S. Cl. .................. 219/9.5; 219/10.41; 228/107
[58] Field of Search .................. 228/107; 219/7.5, 9.5, 219/10.41; 72/56

[56] References Cited

U.S. PATENT DOCUMENTS

| | | | |
|---|---|---|---|
| 2,976,907 | 3/1961 | Harvey et al. | 72/56 |
| 3,195,335 | 7/1965 | Brower et al. | 72/56 |
| 3,258,573 | 6/1966 | Morin et al. | 219/7.5 X |
| 3,794,805 | 2/1974 | Rudd | 219/7.5 X |
| 4,144,433 | 3/1979 | Zelahy et al. | 219/9.9 |

Primary Examiner—Roy N. Envall, Jr.
Assistant Examiner—M. M. Lateef
Attorney, Agent, or Firm—Herzig, Schaap & Yanny

[57] ABSTRACT

A system and method using magnetic pressure to propel a ballistic workpiece onto a stationary workpiece at sufficient velocity to produce a weld. Electrical power capacitors are connected to an electromagnetic coil which is positioned adjacent a ballistic workpiece which is propelled by pressures of magnetic force between the ballistic workpiece and the coil onto the adjacent stationary workpiece at sufficient velocity to form a weld.

13 Claims, 10 Drawing Figures

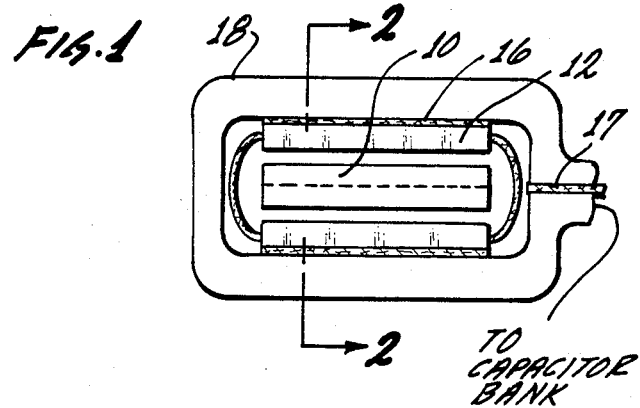
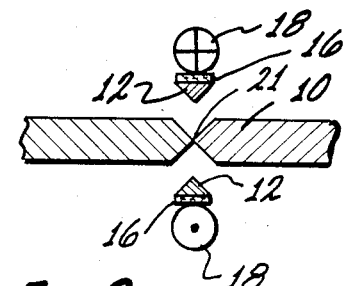
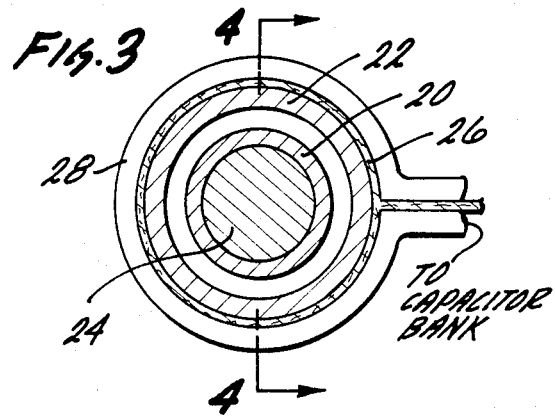
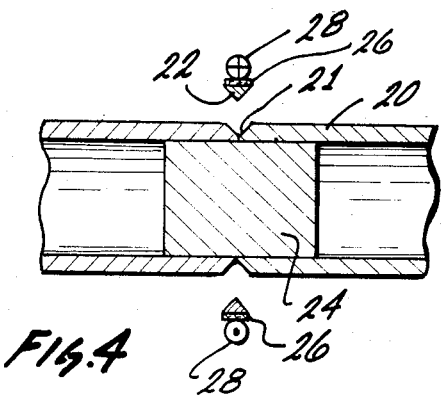
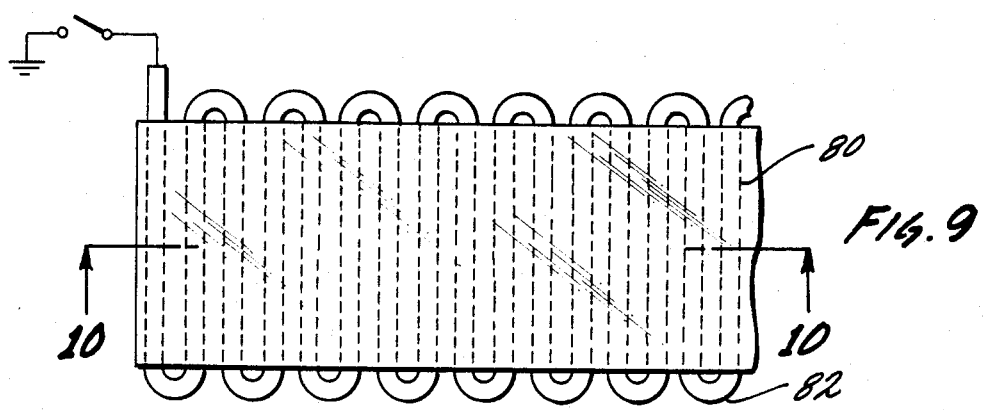
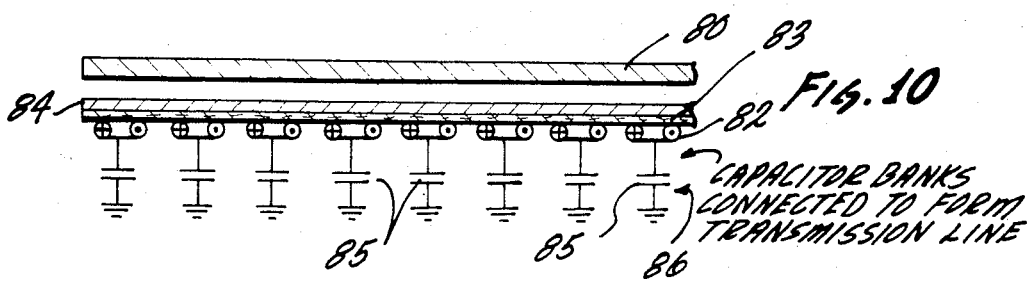

CAPACITOR BANKS CONNECTED TO SOLENOID TO FORM TRANSMISSION LINE

TO CAPACITOR BANK

SYSTEM AND METHOD FOR IMPACT WELDING BY MAGNETIC PROPULSION

CROSS-REFERENCE TO RELATED APPLICATIONS

A related application entitled "System and Method for Impact Welding by Magnetic Implosion" was filed on Oct. 20, 1981, under Ser. No. 312,964.

BACKGROUND OF THE INVENTION

1. Field of the Invention

The invention pertains to systems and methods for impact welding by magnetic propulsion.

2. Description of the Prior Art

Impact welding is a known technique. By this method, a ballistic work piece is caused to collide at a velocity of 350 meters per second and an angle of 8–12 degrees with a part or parts to be welded. The joinder is apparently the result of a jetting action between the colliding surfaces which is such that it cleans the surfaces, thus providing the capability of a joinder through the well-known interaction of smooth and clean surfaces. In many applications, impact welding is accomplished through the technique known as explosive welding, whereby the appropriate collision velocity is attained by means of a chemical explosion which hurls the ballistic work piece against the parts to be joined. This technique is used in various applications, such as pipe welding and the like; however, it has obvious disadvantages in its requirement of high skill on the part of the welder, its inescapable hazard, and the noise produced by the technique, among other disadvantages.

Other methods have been utilized in order to achieve the required collision velocity and angle for impact welding. Among these is the use of magnetic implosion to thrust the ballistic work piece against the work piece to be welded. Under this technique, a plurality of wires, known as a driving coil, are affixed to a ballistic work piece and are connected to a power source, such as a capacitor bank. The required collision velocity is achieved by means of a magnetic implosion which results from a surge of current through the power source which causes implosion through the mutual repulsion of the work piece and the components of the driving coil. This technique has been used in particular to weld the ends of nuclear fuel rods and has also found application in other contexts in which the diameters of the parts to be joined are small.

Extension of the technique of magnetic implosion to parts of large dimensions has not taken place, primarily because of the inefficiency of power utilization therein.

Specific examples of existing apparatus and methods relating to impact welding by magnetic implosion are U.S. Pat. Nos. 2,976,907 and 3,195,335, together with an article appearing in the Journal of Applied Physics, Volume 50, November, 1979, No. 11, Part 2, entitled "Measurements of a 70 T Pulsed Magnetic System with Long Operational Life."

Therefore, there has been a felt but unfulfilled need for a system and method for accomplishing impact welding such that such technique may be applied to work pieces of substantial diameter, such as those found in oil pipelines.

SUMMARY OF THE INVENTION

A system for impact welding by magnetic propulsion for butt welding of substantially flat plates comprises at least one ballistic work piece member in the form of a substantially straight bar aligned with a stationary work piece to be welded and driving coil means disposed adjacent the at least one ballistic work piece member and connectable to a power source such that upon actuation of the power source, magnetic forces in the driving coil means drive said ballistic work piece member to collide with the stationary work piece member at welding velocity.

A system for impact welding by magnetic propulsion for girth pipe welding comprises a ballistic work piece member configured substantially in the form of a ring disposed about a work piece to be welded and driving coil means configured substantially in the form of a ring disposed adjacent the ballistic work piece member, the driving coil means being connectable to a power source.

A system for impact welding by magnetic propulsion for use with heat exchanger tubes and tube sheets to be welded together comprises a ballistic work piece member disposed between pairs of heat exchanger tubes and heat exchanger tube sheets and driving coil means disposed adjacent the ballistic work piece member being aligned at a chamfered intersection between the heat exchanger tube and the heat exchanger tube sheet such that the driving coil means thrusts the ballistic work piece member at welding velocity into the chamfered intersection upon actuation of the power source.

A system for impact welding by magnetic propulsion for lap welding of pipes and for cylindrical cladding comprises a ballistic work piece member comprising a section of pipe capable of accommodating therein a section of pipe to be welded and driving coil means disposed adjacent the ballistic work piece member, the driving coil means comprising a solenoid member being connectable to a power source.

A system for impact welding by magnetic propulsion for plane cladding comprises a ballistic work piece member in the form of a flyer plate member disposed adjacent a parent plate member to be joined thereto and driving coil means disposed adjacent the flyer plate member and connectable to a power source such that upon actuation of the power source, the driving coil means thrusts the flyer plate member at welding velocity against the parent plate member.

A method for impact welding by magnetic propulsion comprises the steps of (1) providing a ballistic work piece for colliding with a stationary work piece to be welded at welding velocity and (2) providing driving coil means connectable to a power source positioned such that upon actuation of the power source, the driving coil means thrusts the ballistic work piece at welding velocity to collide with the stationary work piece.

BRIEF DESCRIPTION OF THE DRAWINGS

FIG. 1 depicts a system for impact welding by magnetic propulsion configured for application to butt welding flat plates, in elevation view;

FIG. 2 is a section through the line 2—2 of FIG. 1;

FIG. 3 is an elevation view of a system in accordance with the invention configured for application to girth pipe welding;

FIG. 4 is a section through the system of FIG. 3 along the line 4—4;

FIG. 9 is an elevation of a system in accordance with the invention having a configuration for cladding large plates; and FIG. 10 is a sectional view of FIG. 9 through the line 10—10.

DETAILED DESCRIPTION OF THE INVENTION

Figure 5:
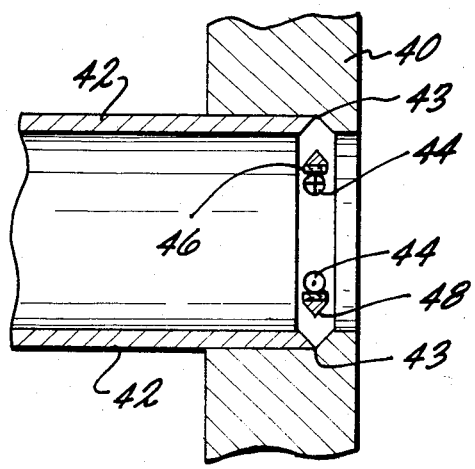
FIG. 5 is a side elevation of a system in accordance with the invention having a configuration of a driving coil ballistic work piece for application to welding tubes into a tube sheet to form a heat exchanger.

Referring to FIGS. 1 and 2, involving butt welding of flat plates, a work piece 10 comprises a flat plate. A ballistic work piece 12 in the form of a pair of suitably shaped bars is positioned symmetrically about the work piece 10. An electrical insulator 16 is disposed upon ballistic work piece 12. A driving coil 18 is positioned upon the electrical insulator 16, which may be of rubber or similar material. The insulator 16 is necessary to prevent a short circuit through the ballistic work piece. For ballistic work pieces of low electrical conductivity, a highly conducting pusher plate between the insulator and the work piece is desirable to minimize intrusion of magnetic flux lines into the ballistic work piece, which would diminish the effectiveness of the magnetic propulsion welding which is accomplished by the invention. The driving coil 18 comprises a plurality of turns of electrical wire connected to a capacitor bank, or other power source (not shown).

In an application of the invention, the magnetic propulsion of the ballistic work piece is accomplished by implosion, i.e., by the inward thrust or collapse of an array of wires due to magnetic forces therebetween; however, such propulsion may also be achieved by magnetic explosion, i.e., an outward thrust by a plurality of wires due to magnetic forces. The work piece 10 is chamfered to form a target for the ballistic work piece 12, the chamfer angle being such as to provide the necessary angle between the ballistic work piece 12 and the stationary work piece 10.

Referring to FIGS. 3 and 4, the situation of a ring-shaped driving coil driving a ring-shaped work piece is depicted therein. This applies to the situation which would occur in connection with impact welding of pipe and other cylindrical pieces. The arrangement comprises a work piece 20 in the form of a pipe, such as that employed in connection with oil pipelines. Work piece 20 includes chamfers 21 that are of the conventional 60-90-degree type employed in conventional fusion welding.

Arrayed around the chamfers 21 and positioned accurately with respect to concentricity and alignment of the chamfers is a driving coil 28. The driving coil 28 is of ring-shaped configuration. A ballistic work piece 22 is of ring-shaped configuration. A ballistic work piece 22 is disposed around the stationary work piece 20 and in alignment with the chamfers 21. Between the driving coil 28 and the ballistic work piece 22 is interposed a layer of electrical insulation 26. Ballistic work piece 22 comprises a ring of the same material as the pipe 20. A minor cross-section of the work piece 28 is configured so that when the work piece 28 reaches the impact radius, it will have assumed the cross-section of the chamfer 21 with approximately an angle of 5–8 degrees between the ballistic work piece 28 and the stationary work piece 20. Thus, upon colliding with the pipe 20, the ring 28 will provide an impact weld with a chamfer 21 and will supply the fill metal of this weld. A mandrel 24 may be required in some applications to be inserted into the pipe 20 to prevent constriction or buckling in the pipe unless the pipe is extremely massive and rigid.

FIG. 5 depicts a system in accordance with the invention applied to welding tube sheets in a heat exchanger. As depicted in FIG. 5, tube sheets 40 are to be welded to heat exchanger tubes 42. Chamfers 43 are prepared between the tube sheets 40 and heat exchanger tubes 42. A driving coil 44 is arrayed concentrically and in alignment with the chamfers 43. Adjacent to the driving coil 44 is electrical insulation 46 and a ballistic work piece in the form of a ring 48. The driving coil 44 is connected to a power source (not shown) of the same type employed with the applications described and depicted hereinabove. In this application, the magnetic propulsion of the ballistic work piece 48 into the chamfers 43 of the heat exchanger tubes 42 is accomplished by a magnetic explosion, that is, the ballistic work piece is thrust outwardly toward the stationary work piece as a result of forces of magnetic repulsion within the driving coil 44.

Figure 6:
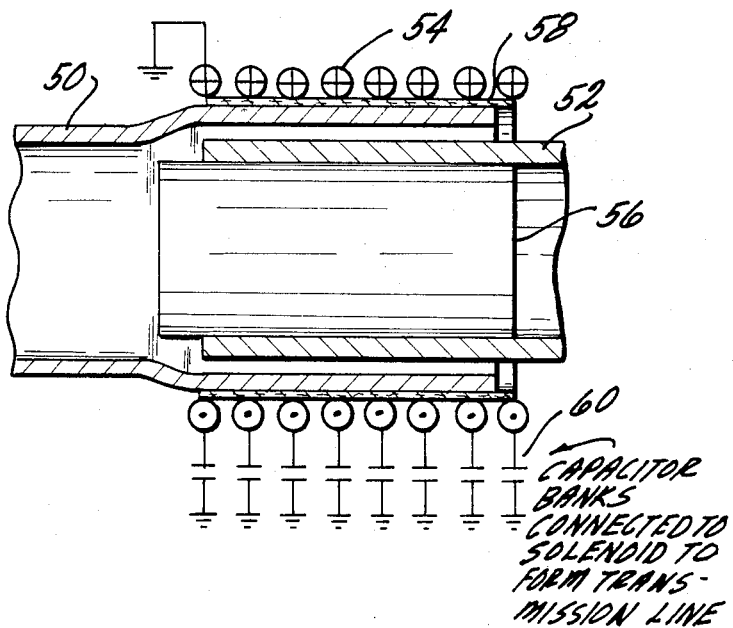
FIG. 6 is a front view, somewhat simplified, of a system in accordance with the invention having a configuration for cylindrical cladding or lap pipe welding.

Referring to FIG. 6, this depicts an application of the invention to lap welding of pipes or to cylindrical cladding. Pipes 50, 52 to be joined are disposed within the driving coil 54 in the form of a solenoid, pipe 52 being disposed in an enlarged section of pipe 50. A mandrel 56 is positioned within pipe 52 to prevent buckling and constriction upon impact. The driving coil 54 is disposed on electrical insulator 58 which in turn is disposed upon pipe 50 at the enlarged section thereof in which is disposed pipe 52. Driving coil 54 is connected to a plurality of capacitor banks 60 to form a transmission line. Welding is accomplished when the capacitor banks are energized and power is transmitted to the driving coil 54.

Figure 8:
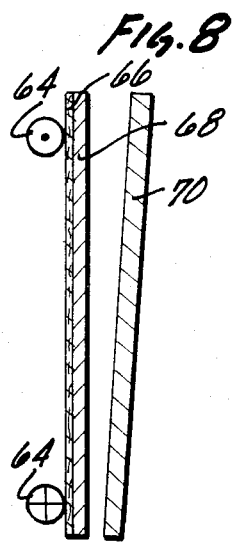
FIG. 8 depicts a system of FIG. 7 in section along the line 8—8.
Figure 7:
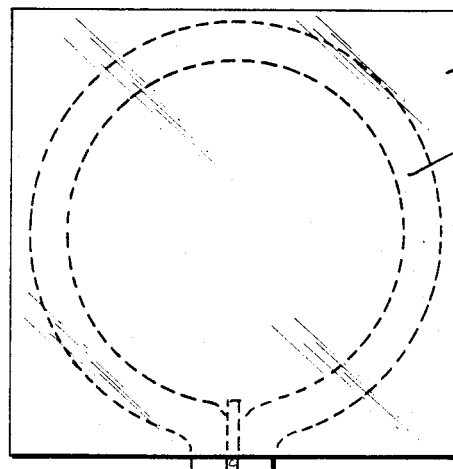
FIG. 7 is a front view of a system in accordance with the invention having a configuration for plane cladding or impact forming.

Referring to FIGS. 7 and 8, these depict the invention arranged for the application of accelerating a flat metal plate for plane cladding or impact forming. Use of explosives to provide the requisite velocity of the ballistic work piece in such applications is known. Applicant's invention utilizes in this application magnetic forces to achieve that velocity. A driving coil 64 is disposed upon electrical insulation 66 which in turn is disposed upon a ballistic work piece in the form of a metal flyer plate 68. A stationary work piece is in the form of a plate or die 70. The driving coil is circular and is connected to a capacitor bank (not shown); electrical insulator 72 separates the ends of the driving coil. Upon actuation of the power source, magnetic forces rising from current in the driving coil thrust the ballistic work piece at the required velocity to collide with the stationary work piece 70. The flyer plate 68, the driving coil 64, and plate 70 are arranged to provide the required welding angle between plate 68 and plate 70.

FIGS. 9 and 10 depict the invention as applied to the context of a configuration for cladding large plates. As in the application depicted in FIGS. 8 and 9, the use of explosives to achieve the requisite impact velocity in this type of application is known. Applicant's invention affords the capability of achieving the welding velocity through the use of magnetic forces. A stationary work piece in the form of a parent plate 80 is utilized. A driving coil 82 is disposed in a "folded" form on an insulator 83 which in turn is disposed adjacent the flyer plate 84. Driving coil 82 is connected to a power source 86 in the form of a plurality of capacitors in a capacitor bank connected to the coil 82 to form a transmission line. Upon actuation by the power source, the magnetic forces arising in the driving coil compel the flyer plate 84 to strike the parent plate 80 at welding velocity to form a bond therewith.

A method in accordance with the invention involves providing an arrangement of a stationary work piece, a ballistic work piece, and a driving coil connected to a power source and actuating the power source such that magnetic forces in the driving coil thrust the ballistic work piece at welding velocity to collide with the stationary work piece.

Though particular applications of the invention are described and depicted hereinabove, the invention is defined solely by the appended claims interpreted in light of the specification.

What is claimed is:

1. A system for impact welding by magnetic propulsion for butt welding of substantially flat plates comprising:
   at least one ballistic work piece member in the form of a substantially straight bar aligned with a stationary work piece to be welded; and
   driving coil means disposed adjacent said at least one ballistic work piece member and connectable to a power source such that upon actuation of said power source said driving coil means produces approximately $2 \times 10^6$ to $3 \times 10^6$ psi of magnetic pressure on said ballistic member to propel said ballistic work piece member to collide with said stationary work piece member at welding velocity.

2. The invention as set forth in claim 1 wherein said ballistic work piece member is positioned to collide with said stationary work piece member at a chamfered section thereof.

3. The invention as set forth in claim 1 wherein said driving coil means is connected to a power source.

4. The invention as set forth in claim 3 wherein said power source includes at least one bank of capacitor means.

5. A system for impact welding by magnetic propulsion for pipe welding comprising:
   a ballistic work piece member configured substantially in the form of a ring disposed about a work piece to be welded;
   driving coil means configured substantially in the form of a ring disposed adjacent said ballistic work piece member, said driving coil means being connectable to a power source so that said driving coil produces approximately $2 \times 10^6$ to $3 \times 10^6$ psi of magnetic pressure on said work piece.

6. The invention as set forth in claim 5 said driving coil means being connected to a power source which includes capacitor means.

7. A system for impact welding by magnetic propulsion comprising:
   a ballistic work piece member disposed adjacent a stationary work piece member to be joined thereto;
   driving coil means disposed adjacent said ballistic member and connectable to a power source such that upon actuation of said power source, said driving coil means thrusts said ballistic member at welding velocity against said stationary work piece member; and
   an insulator mounted between said ballistic work piece member and said driving coil means to prevent passage of electrical current between said coil means and said ballistic work piece.

8. The invention as set forth in claim 7 said driving coil means being connected to a power source including capacitor means.

9. The system of claim 7 wherein said ballistic member is spaced from said stationary member a distance at least twice the thickness of said ballistic work piece member in order that said ballistic member can be accelerated for a sufficient distance to attain welding velocity prior to colliding with said stationary member.

10. The system of claim 7 wherein said ballistic member is positioned to collide with said stationary member at a chamfered section thereof, the faces of said ballistic member which contact said chamfered section being inclined from the faces of said chamfered section at an angle of approximately 5–8 degrees.

11. The system as set forth in claim 7 further including a mandrel, said mandrel positioned adjacent said stationary work piece member to stop movement of said ballistic work piece member at said stationary work piece member.

12. The system as set forth in claim 7 wherein said driving coil means comprises a solenoid member including capacitor means connected to form a transmission line.

13. A method for impact welding by magnetic propulsion comprising the steps of:
   (1) providing a ballistic work piece for colliding with a stationary work piece to be welded at welding velocity; and
   (2) providing driving coil means connectable to a power source and positioned such that upon actuation of said power source said driving coil means produces approximately $2 \times 10^6$ to $3 \times 10^6$ psi of pressure on said ballistic member, said driving coil means thrusts said ballistic work piece at welding velocity to collide with said stationary work piece.

* * * * *